(12) United States Patent
Yokochi (10) Patent No.: US 8,053,061 B2
(45) Date of Patent: Nov. 8, 2011

(54) HIGH-GLOSS DECORATIVE SHEET

(75) Inventor: Eiichiro Yokochi, Saitama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 541 days.

(21) Appl. No.: 11/817,417

(22) PCT Filed: Feb. 28, 2006

(86) PCT No.: PCT/JP2006/303790
§ 371 (c)(1),
(2), (4) Date: Aug. 30, 2007

(87) PCT Pub. No.: WO2006/093165
PCT Pub. Date: Sep. 8, 2006

(65) Prior Publication Data
US 2009/0220800 A1    Sep. 3, 2009

(30) Foreign Application Priority Data
Mar. 1, 2005 (JP) .................. 2005-056416

(51) Int. Cl.
*B32B 3/00* (2006.01)
(52) U.S. Cl. ..... 428/203; 428/204; 428/447; 428/423.1; 428/523; 428/195.1
(58) Field of Classification Search ............ 428/195.1, 428/447, 523, 423.1, 203, 204
See application file for complete search history.

(56) References Cited

U.S. PATENT DOCUMENTS

| 5,236,968 | A | * | 8/1993 | Hirschmann | 522/78 |
| 5,271,988 | A | | 12/1993 | Ikemoto et al. | |
| 6,326,074 | B1 | * | 12/2001 | Takahashi | 428/156 |
| 6,514,624 | B2 | * | 2/2003 | Takemoto | 428/447 |
| 6,558,799 | B2 | * | 5/2003 | Takeuchi et al. | 428/423.1 |
| 6,841,221 | B2 | * | 1/2005 | MacQueen | 428/141 |
| 2001/0046594 | A1 | | 11/2001 | Takemoto | |

FOREIGN PATENT DOCUMENTS

| JP | 04-117466 | 4/1992 |
| JP | 2000-141551 | 5/2000 |
| JP | 2001-225420 | 8/2001 |

OTHER PUBLICATIONS

Supplementary European Search Report dated Sep. 15, 2009, for Application No. EP 06 71 4916.
XP-002544152 (Abstract of JP 5-86308, dated Apr. 6, 1993).

* cited by examiner

*Primary Examiner* — Bruce H Hess
*Assistant Examiner* — Tamra L Amakwe
(74) *Attorney, Agent, or Firm* — Antonelli, Terry, Stout & Kraus, LLP.

(57) ABSTRACT

This invention provides a decorative sheet having a high glossy impression, comprising a surface protective layer formed of an ionizing radiation curing resin, which is excellent in surface specularity and marker ink erasing capability and has suppressed slipperiness as a decorative sheet, and a decorative plate comprising the sheet and a substrate jointed to each other. In the decorative sheet, a silicone having a high lifting effect (the effect of lifting on the surface) and a silicone having high compatibility with the ionizing radiation curing resin are incorporated, either separately from each other or simultaneously, into an ionizing radiation curing resin for forming the surface protective layer. According to this constitution, properties, which are generally likely to be offset by each other, that is, excellent contamination resistance, marker ink erasing capability, and cellophane tape resistance, high leveling properties, surface smoothness, and transparency, and suppressed slipperiness, can be maintained on a high level.

15 Claims, 2 Drawing Sheets

[Fig. 2]

HIGH-GLOSS DECORATIVE SHEET

BACKGROUND OF THE INVENTION

The present invention relates to a decorative sheet having a high gloss feeling which is excellent in a specularity and an oil base ink erasability on a surface and inhibited in a slippiness (hereinafter referred to as a slippiness) of a plate processed to a decorative plate and which has an ionizing radiation-curable resin in a surface protective layer and a decorative plate prepared by bonding the above decorative sheet on a substrate.

PRIOR ART

In general, plates having a structure in which a decorative sheet having, for example, a printed woodgrain pattern thereon is bonded onto a wood base material, an inorganic material, a synthetic resin base material, a metallic material such as a steel plate and the like with an adhesive are used as surface decorative plates for furnitures and cabinets of kitchen wares.

The decorative sheet used for the above surface decorative plates is usually required to be provided with various characteristics including a processing aptitude such as appropriate flexibility, cutting property and breaking resistance for secondary processing such as laminate processing, wrapping processing and V-cutting processing and weatherability, light fastness, heat resistance, water resistance, solvent resistance, surface hardness, abrasion resistance, scratching resistance and the like in use situation.

In order to meet the above requirements, a base material sufficiently satisfying the above processing aptitude is used, and a surface protective layer is provided on the surface of the above base material. Also, an ionizing radiation-curable resin composition is preferably used. The ionizing radiation-curable resin composition is a composition cured by an ionizing radiation such as a UV ray, an electron beam and the like. Use of the above composition makes it possible to coat and form a surface protective layer in the absence of a solvent without using an organic solvent and therefore is favorable to the environment. In addition thereto, the high cross-linking density can be achieved, and therefore such various advantages that the surface strength such as the abrasion resistance and the like is readily provided are obtained.

On the other hand, a high-grade feeling is required to floor tiles, wall panels, furnitures, cabinets of kitchen wares and the like because of a recent trend of consumers directed to high-grade articles, and decorative plates and decorative sheets used for the above articles are desired to have an appearance giving a high-grade feeling. A high gloss feeling and a specularity (surface smoothness) as factors for a high-grade feeling in addition to the characteristics described above such as an abrasion resistance, a chemical resistance, a stain resistance, an oil base ink erasability, a cellophane adhesive tape resistance and the like which have so far usually be required for the properties of a decorative sheet are important as well. Further, paying attentions to a production process for a decorative sheet, important factors are advantageousness in a slipping property of a decorative plate considering transportation of the decorative plate after producing the decorative sheet, that is, capability of avoiding a risk of falling in storing and transporting the decorative plate by reducing a slipping property thereof as well as advantageousness in a viewpoint of a simplification of the steps and a rapidness and a viewpoint of an economical efficiency.

Decorative sheets having a top coating layer formed by coating a urethane base coating material have so far been in a main stream as a decorative sheet having a high lustrous feeling.

The urethane-coated paper having a relatively excellent surface characteristic of a coating film is obtained, but it takes several days in a certain case for ageing of the coating film in a production step, and it is disadvantageous in terms of the productivity. Further, involved therein is the problem that it is not necessarily satisfactory in terms of a specular property (smoothness) and an oil base ink erasability (for example, a patent document 1).

On the other hand, a method for forming a coating film using an ionizing radiation-curable resin composition is known as well and makes it possible to quickly produce a decorative paper, for example, by printing a picture on a substrate paper, then applying or impregnating an electron beam-curable resin composition such as an acrylate base resin and curing it by irradiating with an electron beam (for example, a patent document 2). However, involved therein is the problem that the conventionally known electron beam-curable coating material described above is not necessarily sufficiently satisfactory in terms of the characteristics of a coating film formed.

Because of a roughened surface and the like, it is difficult, as described above, in a conventional coating material composition for a decorative sheet to provide a specular property (smoothness), and therefore it is proposed to add silicone in order to provide a stain resistance and a mold releasing property such as a cellophane adhesive tape resistance and the like (for example, a patent document 3). In the above method, however, a slipping property of the sheet grows high whereas a stain resistance and a mold releasing property such as a cellophane adhesive tape resistance and the like are improved, and therefore involved therein is the problem that a risk in which a laminated board after processed falls in storage and transportation due to a high slipping property of the sheet is brought about. Further, silicone having an inferior compatibility with an ionizing radiation-curable resin is added to the ionizing radiation-curable resin, and therefore room for further improvement in terms of a deterioration in the smoothness on the surface, an increase in the opacity on the surface and damage of the high-grade feeling and the design feeling in order to impart the above characteristics is involved therein.

Patent document 1: Japanese Patent Application Laid-Open No. 92484/1993
Patent document 2: Japanese Patent Publication No. 55991/1989
Patent document 3: Japanese Patent No. 2856862

EXPLANATION OF THE CODES

1. Decorative sheet
2. Substrate
3. Silicone methacrylate
4. Silicone acrylate
5. Surface protective layer
6. Colored layer
7. Picture layer 8. Penetration-preventing layer
9. Adhesive layer
10. Substrate plate

DISCLOSURE OF THE INVENTION

In light of the situation described above, an object of the present invention is to provide a decorative sheet having a high gloss feeling which is excellent in a specularity and an oil base ink erasability on a surface and inhibited in a slippiness of a plate processed to a decorative plate and which has an ionizing radiation-curable resin in a surface protective layer and a decorative plate prepared by bonding the above decorative sheet on a substrate.

Intensive researches repeated by the present inventors in order to achieve the object described above have resulted in making it possible to obtain a decorative sheet in which such characteristics tending to be cancelled each other under normal circumstances that a stain resistance, an oil base ink erasability and a cellophane adhesive tape resistance are excellent and that a leveling property (free of pinholes), a surface smoothness and a transparency are high and a slippiness is inhibited are maintained at a high level by adding silicone having a high lifting effect (effect of floating on a surface) and silicone having a high compatibility with an ionizing radiation-curable resin which forms a surface protective layer at the same time to the ionizing radiation-curable resin.

That is, the present invention provides:
(1) a decorative sheet having a layer obtained by cross-linking and curing an ionizing radiation-curable resin as a surface protective layer, wherein mono- or difunctional silicone methacrylate and multifunctional silicone acrylate are contained in the ionizing radiation-curable resin,
(2) the decorative sheet as described in the above item (1), wherein the silicone acrylate described above has a functional group equivalent of 3000 or less, and a content thereof is 2 mass parts or more per 100 mass parts of the ionizing radiation-curable resin,
(3) the decorative sheet as described in the above item (1) or (2), wherein the multifunctional silicone acrylate described above has a tetrafunctional or higher functional group and
(4) a decorative plate prepared by bonding the decorative sheet as described in any of the above items (1) to (3) on a substrate via an adhesive layer.

EFFECT OF THE INVENTION

According to the present invention, capable of being provided are a decorative sheet having a high gloss feeling which is excellent in a specularity and an oil base ink erasability on a surface and inhibited in a slippiness of a plate processed to a decorative plate and which has an ionizing radiation-curable resin in a surface protective layer and a decorative plate prepared by bonding the above decorative sheet on a substrate via an adhesive layer.

BEST MODE FOR CARRYING OUT THE INVENTION

The high gloss decorative sheet of the present invention is characterized by a decorative sheet having a layer obtained by cross-linking and curing an ionizing radiation-curable resin as a surface protective layer, wherein mono- or difunctional silicone methacrylate and multifunctional silicone acrylate are contained in the ionizing radiation-curable resin.

Figure 1:
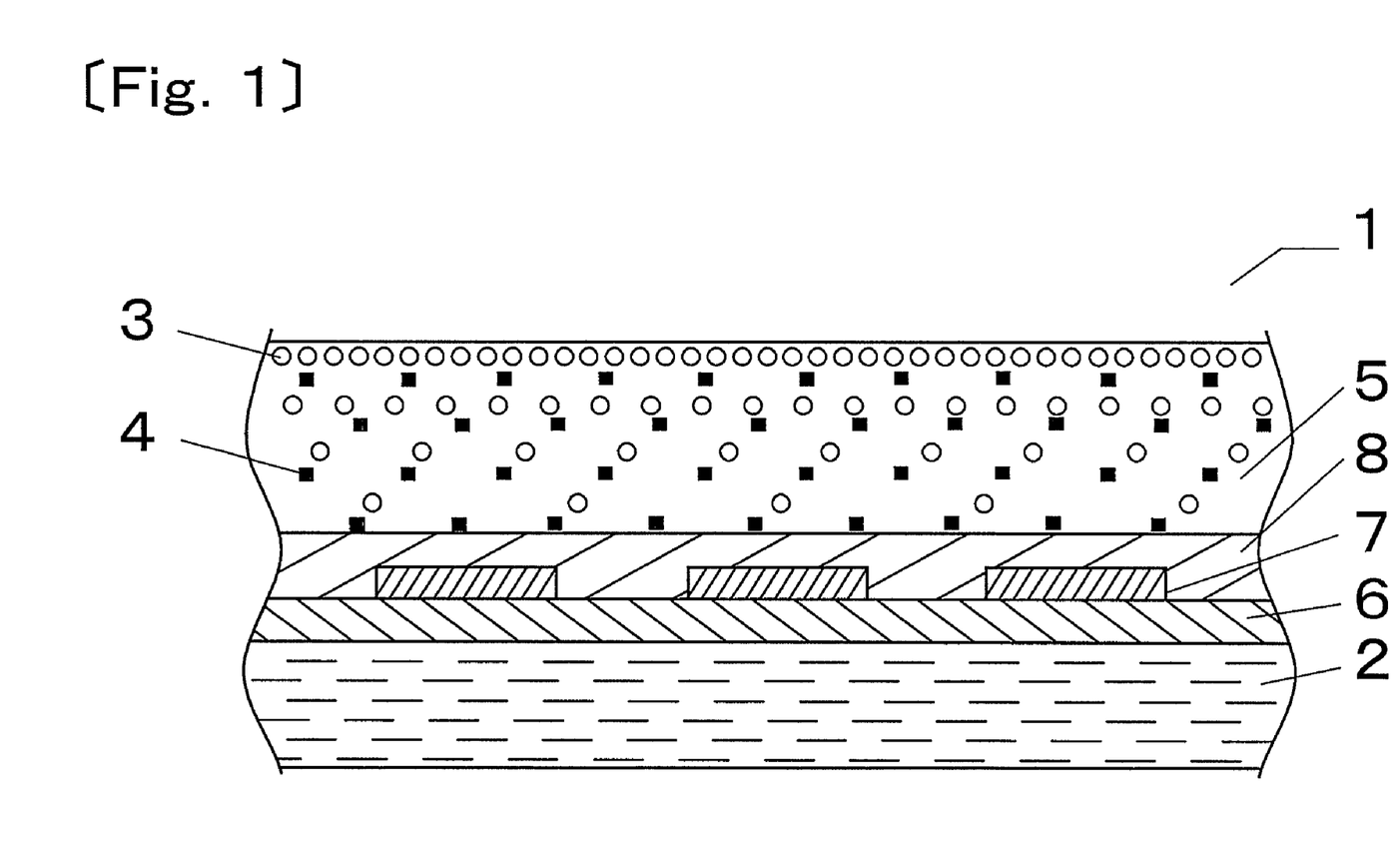
FIG. 1 is a schematic drawing showing a cross section of the decorative sheet according to the present invention.

A typical structure of the high gloss decorative sheet of the present invention shall be explained with reference to FIG. 1. FIG. 1 is a schematic drawing showing a cross section of the decorative sheet 1 of the present invention and a decorative plate prepared by bonding the above decorative sheet on a substrate. In an example shown in FIG. 1, a uniform colored layer 6 covering a whole surface of a substrate 2, a picture layer 7, a uniform penetration-preventing layer 8 and a surface protective layer 5 comprising a resin obtained by cross-linking and curing an ionizing radiation-curable resin composition containing mono- or difunctional silicone methacrylate and multifunctional silicone acrylate are laminated on the substrate 2 in this order. A concentration of silicone methacrylate 3 shown in the drawing is high in an outermost surface layer of the surface protective layer 5 and lower as coming closer to a substrate side. On the other hand, silicone acrylate 4 shown in the drawing is characterized by dispersing uniformly in the surface protective layer 5.

Figure 2:
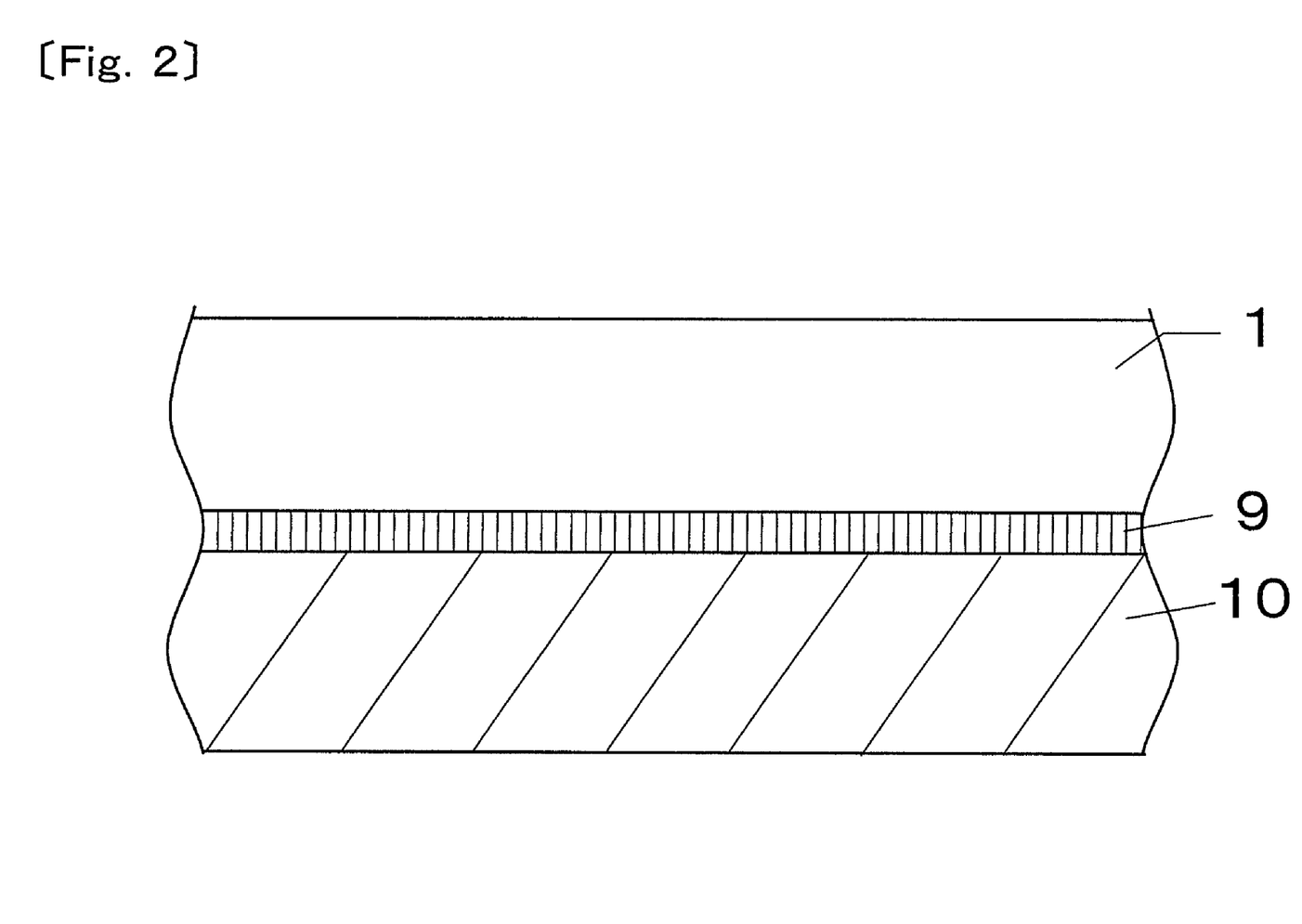
FIG. 2 is a schematic drawing showing a cross section of the decorative plate according to the present invention.

The decorative sheet of the present invention can be used as a decorative plate by adhering on various substrate plates. To be specific, the decorative sheet 1 is adhered, as shown in FIG. 2, on a substrate plate 10 via an adhesive layer 9.

The present invention shall be explained below in details with reference to FIG. 1 showing one of the preferred embodiments of the present invention.

The substrate 2 used in the present invention shall not specifically be limited as long as it is ordinarily used as a decorative sheet, and various papers, plastic films, plastic sheets, metal foils, metal sheets, metal plates, wood base plates of timbers, ceramic base materials and the like can suitably be selected according to the applications. The above materials may be used alone or in the form of laminates prepared by optional combinations thereof such as composites of papers, composites of papers and plastic films and the like.

When the above substrates, particularly, the plastic films and the plastic sheets are used as the substrate, one surface or both surfaces of the substrate can be subjected, if necessary, to physical or chemical surface treatment by an oxidation method or a roughening method in order to enhance adhesion of the substrate to a layer provided thereon.

The oxidation method described above includes, for example, corona discharge treatment, chromium oxidation treatment, flame treatment, hot air treatment, ozone/UV treatment and the like. The roughening method includes, for example, a sand blast method, a solvent method and the like. The above surface treatments can suitably be selected according to the kind of the substrates, and in general, the corona discharge treatment method is preferably used in terms of an effect and an operating property.

Further, a primer layer may be formed on the above substrate for the purpose of strengthening interlayer adhesion between the substrate and the respective layers, and coating may be carried out in order to adjust the color, or a pattern may be formed thereon in advance from the viewpoint of a design.

Tissue papers, kraft papers, titanium papers and the like can be used as the various papers used for the substrate. These paper substrates may further contain (impregnating the resin after paper-making or adding the resin during paper-making) resins such as acrylic resins, styrene-butadiene rubbers, melamine resins, urethane resins and the like in order to enhance a strength between fibers of the paper substrate or an interlayer strength between the other layers and the paper substrate and prevent formation of fuzz. Included are, for example, interlayer reinforced papers and resin-impregnated papers.

In addition to the above papers, included are various papers which are used in many cases in the building material field, such as linter papers, paper boards, base papers for gypsum boards and raw fabrics for vinyl wall papers in which a vinyl chloride resin layer is provided on a surface of the paper. Further, capable of being used as well are coated papers, art papers, parchment papers, glassine papers, paraffin papers and Japanese papers which are used in the business field and ordinary printing and packaging. Further, woven fabrics and nonwoven fabrics of various fibers which have an appearance and properties similar to those of papers, though distinguished from these papers, can also be used as the substrate. The various fibers include inorganic fibers such as glass fibers, asbestos fibers, potassium titanate fibers, alumina fibers, silica fibers and carbon fibers and synthetic resin fibers such as polyester fibers, acrylic fibers and vinylon fibers.

The plastic films or the plastic sheets include films or sheets comprising various synthetic resins. The synthetic resins include polyethylene resins, polypropylene resins, polymethylpentene resins, polyvinyl chloride resins, polyvinylidene chloride resins, polyvinyl alcohol resins, vinyl chloride/vinyl acetate copolymer resins, ethylene-vinyl acetate copolymer resins, ethylene-vinyl alcohol copolymer resins, polyethylene terephthalate resins, polybutylene terephthalate resins, polyethylene naphthalate-isophthalate copolymer resins, polymethyl methacrylate resins, polyethyl methacrylate resins, polybutyl methacrylate resins, polyamide resins represented by nylon 6, nylon 66 and the like, cellulose triacetate resins, cellophane, polystyrene resins, polycarbonate resins, polyallylate resins, polyimide resins and the like.

Products comprising, for example, aluminum, iron, stainless steel, copper and the like can be used as the metal foil, the metal sheet and the metal plate, and products plated with the above metals can be used as well. The various wood base plates include veneers, plywoods, laminated woods and particle boards of timbers and woody fiber plates such as MDF (medium density fiber boards) and the like. Examples given as the ceramic base materials include ceramic base building materials such as gypsum boards, calcium silicate boards and wood chip cement boards, pottery and porcelain, glass, porcelain enamel, baked tiles and the like. In addition to the above substrate plates, capable of being used as well for the substrate are composites of various materials such as fiber-reinforced plastic (FRP) plates, plates obtained by sticking iron plates on both surfaces of a paper honeycomb and plates obtained by interposing a polyethylene resin between two aluminum plates.

A thickness of the substrate 2 shall not specifically be restricted. When using a sheet comprising a plastic as a raw material, the thickness falls in a range of usually 20 to 150 μm, preferably 30 to 100 μm, and when using a paper substrate, a basic weight thereof falls in a range of usually 20 to 150 g/m$^2$, preferably 30 to 100 g/m$^2$.

The uniform colored layer 6 shown in FIG. 1 which covers the whole surface is provided, if necessary, for the purpose of enhancing a design property of the decorative sheet of the present invention, and it is referred to as a masking layer or a whole solid layer. The colored layer 6 is formed when the substrate 2 itself is colored or uneven in a color to arrange a color of a surface of the substrate 2, whereby the substrate 2 is provided on a surface thereof with an intended color. The colored layer is formed usually with an opaque color in many cases, but it is formed with a tinted transparent color in a certain case to make the best use of a pattern of the substrate. In a case where a white color of the substrate 2 is used efficiently or the substrate 2 itself is suitably tinted, the colored layer 6 does not have to be formed.

Materials prepared by appropriately mixing a binder with a colorant such as a pigment and a dye, an extender pigment, a solvent, a stabilizer, a plasticizer, a catalyst, a hardening agent and the like are used as an ink used for forming the colored layer. The above binder shall not specifically be restricted, and optional ones selected from, for example, polyurethane base resins, vinyl chloride/vinyl acetate base copolymer resins, vinyl chloride/vinyl acetate/acrylic resin base copolymer resins, chlorinated polypropylene base resins, acrylic base resins, polyester base resins, polyamide base resins, butyral base resins, polystyrene base resins, nitrocellulose base resins and cellulose acetate base resins are used alone or in a mixture of two or more kinds thereof.

Used as the colorant are inorganic pigments such as carbon black (Japanese ink), iron black, titanium white, antimony white, chrome yellow, titanium yellow, iron oxide red, cadmium red, ultramarine blue, cobalt blue and the like, organic pigments and dyes such as quinacridone red, isoindolinone yellow, phthalocyanine blue and the like, metallic pigments comprising scale-like foil pieces of aluminum, brass and the like and pearlescent (pearl) pigments comprising scale-like foil pieces of titanium dioxide-coated mica, basic lead carbonate and the like.

A so-called solid printing layer having a thickness of 1 to 20 μm is suitably used as the above colored layer 6.

The picture layer 7 shown in FIG. 1 serves for imparting a decorative design to the substrate 2, and it is formed by printing various patterns with an ink using a printer. The patterns include woodgrain patterns, stone-grain patterns imitating the surfaces of rocks such as marble pattern (for example, travertine marble patterns) and the like, fabric patterns imitating a blanket texture pattern and a cloth-like pattern, tiling patterns, brick work patterns and the like, and they include as well composite patterns thereof such as parquetry patterns, patchwork patterns and the like. The above patterns are formed by multi-color printing with process colors including yellow, red, blue and black colors, and in addition thereto, they are formed as well by multi-color printing with special colors using plates of individual colors constituting the patterns.

The same inks as the inks used for the colored layer 6 can be used as the picture inks used for the picture layer 7.

The penetration-preventing layer 8 shown in FIG. 1 is provided if necessary and has a function of inhibiting an ionizing radiation-curable resin constituting the surface protective layer 5 from penetrating into the substrate 2, and it displays an effect particularly when the substrate 2 comprises a penetrative material such as a paper and a nonwoven fabric. Accordingly, the penetration-preventing layer 8 may stay in a position between the substrate 2 and the surface protective layer 5, and it is provided, for example, between the substrate 2 and the colored layer 6, between the colored layer 6 and the picture layer 7 or between the picture layer 7 and the surface protective layer 5 as shown in FIG. 1. Usually, a uniform layer obtained by cross-linking and curing a curable resin which has an adhesive property with the ionizing radiation-curable resin constituting the surface protective layer 5 is provided between the picture layer 7 and the surface protective layer 5 as shown in FIG. 1. This plays both the functions of smoothening the surfaces of the colored layer 6 and the picture layer 7 when these layers are present on the substrate 2 and enhancing an adhesive property of these layers with the surface protective layer 5.

Next, the surface protective layer 5 is obtained, as described above, by cross-linking and curing the ionizing radiation-curable resin composition, and it is constituted from the above ionizing radiation-curable resin containing mono- or difunctional silicone methacrylate and multifunctional silicone acrylate. In this regard, the ionizing radiation-curable resin composition means a resin composition having an energy quantum capable of cross-linking and polymerizing molecules thereof when exposed to an electromagnetic wave or a charged particle beam, that is, a resin composition which is cross-linked and cured by irradiating with a UV ray or an electron beam.

An original purpose of the above surface protective layer, that is, a conventional purpose of providing the surface protective layer is to impart chemical surface properties (a stain resistance, a chemical resistance, a cellophane adhesive tape resistance and the like) and mechanical properties (a scratch resistance, an abrasion resistance and the like) according to the uses. In the present invention, the resin containing mono- or difunctional silicone methacrylate and multifunctional silicone acrylate is used for the ionizing radiation-curable resin composition in the surface protective layer to thereby obtain a decorative sheet which is improved in a stain resistance, an oil base ink erasability, a cellophane adhesive tape resistance, a leveling property, a surface smoothness and a cloudiness (transparency) and which is inhibited in a slippiness. The mono- or difunctional silicone methacrylate contained in the ionizing radiation-curable resin composition of the surface protective layer imparts primarily a stain resistance, an oil base ink erasability and a cellophane adhesive tape resistance, and the multifunctional silicone acrylate imparts primarily the characteristics of enhancing a leveling property, a surface smoothness and a cloudiness (transparency) and reducing a slippiness.

The silicone methacrylate is one of modified silicone oils obtained by introducing a methacryl group into one or both ends of a silicone oil comprising polysiloxane. Compounds which have so far been publicly known can be used as the mono- or difunctional silicone methacrylate used for the silicone methacrylate 3, and they shall not specifically be restricted as long as an organic group is a methacryl group and they are modified silicone oils having one or two organic groups described. The structure of the modified silicone oils is classified roughly into a side chain type, a both end type, a single end type and a side chain both end type depending on the bonding positions of the organic groups to be substituted, but the bonding positions of the organic groups shall not specifically be restricted.

Silicone methacrylate having the conditions of a molecular weight of 1000 to 6000, preferably 3000 to 6000 and a functional group equivalent (molecular weight/number of functional group) of 500 to 3000, preferably 1500 to 3000 is used for the above silicone methacrylate.

Compounds which have so far been publicly known can be used as the multifunctional silicone acrylate used for the silicone acrylate 4, and they shall not specifically be restricted as long as they are modified silicone oils in which an organic group is an acryl group and which has plural, preferably 4 or more and more preferably 4 to 6 organic groups described above. The structure of the modified silicone oils is classified roughly into a side chain type, a both end type, a single end type and a side chain both end type depending on the bonding positions of the organic groups to be substituted, but the bonding positions of the organic groups shall not specifically be restricted.

Silicone acrylates having the conditions of a molecular weight of 3000 to 100000, preferably 10000 to 30000 and a functional group equivalent (molecular weight/number of functional group) of 750 to 25000, preferably 3000 to 6000 are used for the above silicone acrylate.

A content of the mono- or difunctional silicone methacrylate described above is 1.5 to 20 mass parts, preferably 2 to 4 mass parts per 100 mass parts of the ionizing radiation-curable resin. A content of the multifunctional silicone acrylate described above is 1 to 20 mass parts, preferably 1 to 10 mass parts per 100 mass parts of the ionizing radiation-curable resin.

A ratio of the contents of the silicone methacrylate and the silicone acrylate 1:1 to 1:5, preferably 1:2 to 1:3 (mass ratio).

Compounds which have so far been publicly known can suitably be used as the ionizing radiation-curable resin used for the surface protective layer 5. To be specific, capable of being used are compounds suitably selected from polymerizable monomers and polymerizable oligomers or prepolymers which have so far been conventionally used as an ionizing radiation-curable resin composition.

To be representative, the polymerizable monomers are suitably (meth)acrylate base monomers having a radically polymerizable unsaturated group in a molecule, and among them, multifunctional (meth)acrylates are preferred. The multifunctional (meth)acrylates shall not specifically be restricted as long as they are (meth)acrylates having two or more ethylenically unsaturated bonds in a molecule. To be specific, they include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol di(meth)acrylate hydroxypivalate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate, ethylene oxide-modified bisphenol A diacrylate and the like. The above multifunctional (meth)acrylates may be used alone or in combination of two or more kinds thereof.

In the present invention, monofunctional (meth)acrylates can suitably be used in combination with the multifunctional (meth)acrylate described above for the purpose of reducing a viscosity of the multifunctional (meth)acrylate as long as the effects of the present invention are not damaged. The monofunctional (meth)acrylates include, for example, methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate and the like. The above monofunctional (meth)acrylates may be used alone or in combination of two or more kinds thereof.

Next, the polymerizable oligomers include oligomers having a radically polymerizable unsaturated group in a molecule, for example, epoxy (meth)acrylate base oligomers, urethane (meth)acrylate base oligomers, polyester (meth)acrylate base oligomers, polyether (meth)acrylate base oligomers and the like. In this respect, the epoxy (meth)acrylate base oligomers can be obtained, for example, by reacting an oxirane ring of a relatively low molecular weight bisphenol type epoxy resin or novolak type epoxy resin with (meth)acrylic acid to esterify it. Further, capable of being used as well are carboxyl-modified epoxy (meth)acrylate oligomers obtained by partially modifying the above epoxy (meth)acrylate base oligomers with a dibasic carboxylic anhydride. The urethane (meth)acrylate base oligomers can be obtained, for example, by reacting polyether polyols or polyester polyols with polyisocyanates to obtain polyurethane oligomers and esterifying the polyurethane oligomers thus obtained with (meth)acrylic acid. The polyester (meth)acrylate base oligomers can be obtained, for example, by condensing polyvalent carboxylic acids with polyhydric alcohols to obtain polyester oligomers having hydroxyl groups at both ends and esterifying the hydroxyl groups of the polyester oligomers thus obtained with (meth)acrylic acid, or by adding alkylene oxides to polyvalent carboxylic acids to obtain oligomers and esterifying a hydroxyl group of the oligomers thus obtained at an end with (meth)acrylic acid. The polyether (meth)acrylate base oligomers can be obtained, for example, by esterifying a hydroxyl group of polyether polyols with (meth)acrylic acid.

Further, the polymerizable oligomers include, in addition to the above compounds, polybutadiene (meth)acrylate base oligomers having a high hydrophobicity in which a polybutadiene oligomer has a (meth)acrylate group on a side chain, silicone (meth)acrylate base oligomers having a polysiloxane bond on a main chain, aminoplast resin (meth)acrylate base oligomers obtained by modifying an aminoplast resin having a large number of reactive groups in a small molecule thereof and oligomers having a cationically polymerizable functional group in a molecule such as novolak type epoxy resins, bisphenol type epoxy resins, aliphatic vinyl ethers and aromatic vinyl ethers.

When a UV-curable resin composition is used as the ionizing radiation-curable resin composition, a photopolymerization initiator is preferably added thereto in an amount of about 0.1 to 5 mass parts per 100 mass parts of the resin composition. The photopolymerization initiator shall not specifically be restricted and can suitably be selected from conventionally used compounds. The photopolymerization initiator used for polymerizable monomers or polymerizable oligomers having radically polymerizable unsaturated groups in molecules thereof include, for example, benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and the like.

The photopolymerization initiator used for polymerizable oligomers having cationically polymerizable functional groups in molecules thereof include aromatic sulfonium salts, aromatic diazonium salts, aromatic iodonium salts, metallocene compounds, benzoin sulfonic esters and the like.

Also, p-dimethylbenzoic esters, tertiary amines, thiol base sensitizers and the like can be used as a photosensitizer.

In the present invention, an electron beam-curable resin composition is preferably used as the ionizing radiation-curable resin composition. The electron beam-curable resin composition can be used in the absence of a solvent and is more preferred from the viewpoint of environmental protection and human health. Further, it does not require a photopolymerization initiator and provides a stable curing property.

The ionizing radiation-curable resin composition used in the present invention can be blended with various additives according to the required physical properties of the cured resin layer obtained. The above additives include, for example, weatherability-improving agents, abrasion resistance-improving agents, polymerization inhibitors, cross-linking agents, IR absorbing agents, antistatic agents, adhesion-improving agents, leveling agents, thixotropic agents, coupling agents, plasticizers, defoaming agents, fillers, solvents, colorants and the like.

In this respect, UV-absorbing agents and light stabilizers can be used as the weatherability-improving agent. The UV-absorbing agents may be either inorganic or organic compounds. Titanium oxide, cerium oxide and zinc oxide each having an average particle diameter of 5 to 120 nm can be used as the inorganic UV-absorbing agent. The organic UV-absorbing agent includes, for example, benzotriazole base compounds, to be specific, 2-(2-hydroxy-5-methylphenyl)benzotriazole, 2-(2-hydroxy-3,5-di-tert-amylphenyl)benzotriazole and 3-[3-(benzotriazole-2-yl)-5-tert-butyl-4-hydroxyphenyl]propionic ester of polyethylene glycol. On the other hand, the light stabilizer include, for example, hindered amine base compounds, to be specific, bis(1,2,2,6,6-pentamethyl-4-piperizyl) 2-(3,5-di-tert-butyl-4-hydroxybenzyl)-2'-n-butylmalonate, bis(1,2,2,6,6-pentamethyl-4-piperidyl) sebacate and tetrakis(2,2,6,6-tetramethyl-4-piperidyl)-1,2,3,4-butanetetracarboxylate. Further, reactive UV-absorbing agents and light stabilizers having polymerizable groups such as a (meth)acryloyl group in molecules thereof can also be used as the UV-absorbing agent and the light stabilizer.

The abrasion resistance-improving agent includes, for example, in the case of the inorganic compounds, spherical particles of α-alumina, silica, kaolinite, iron oxide, diamond, silicon carbide and the like. The particle form shall not specifically be restricted and includes a spherical shape, an ellipsoidal shape, a polyhedral shape, a scale-like shape and the like, and the spherical shape is preferred. The organic abrasion resistance-improving agent includes beads of synthetic resins such as cross-linked acrylic resins, polycarbonate resins and the like. The particle diameter thereof is usually 30 to 200% of the film thickness. Among the above abrasion resistance-improving agents, spherical α-alumina is particularly preferred in terms of a high hardness, a large effect of enhancing the abrasion resistance and relatively easily obtaining the spherical particles.

Used as the polymerization inhibitor are, for example, hydroquinone, p-benzoquinone, hydroquinone monomethyl ether, pyrogallol, t-butyl catechol and the like. Used as the cross-linking agent are, for example, polyisocyanate compounds, epoxy compounds, metal chelate compounds, aziridine compounds, oxazoline compounds and the like.

Used as the filler are, for example, barium sulfate, talc, clay, calcium carbonate, aluminum hydroxide and the like.

Used as the colorant are, for example, publicly known coloring pigments such as quinacridone red, isoindolinone yellow, phthalocyanine blue, phthalocyanine green, titanium oxide, carbon black and the like.

Used as the IR-absorbing agent are, for example, dithiol base metal complexes, phthalocyanine base compounds, diimmonium compounds and the like.

In the present invention, the above polymerizable monomers or polymerizable oligomers as the ionizing radiation-curable component and various additives are homogeneously mixed in prescribed proportions to prepare a coating solution comprising the ionizing radiation-curable resin composition. A viscosity of the above coating solution shall not specifically be restricted as long as it is a viscosity at which an uncured resin layer can be formed on a surface of the substrate by a coating method described later.

In the present invention, the coating solution thus prepared is applied on a surface of the substrate in a thickness of 1 to 20 μm after cured by a publicly known method such as gravure coating, bar coating, roll coating, reverse roll coating and Komma coating, preferably gravure coating, to form an uncured resin layer. A thickness of 1 μm or more after cured provides the cured coating layer having desired functions. A thickness of the surface protective layer after cured is preferably 2 to 20 μm.

In the present invention, the uncured resin layer thus formed is irradiated with an ionizing radiation such as an electron beam and a UV ray to cure the uncured resin layer. When an electron beam is used as the ionizing radiation, the acceleration voltage can suitably be selected according to the resin used and a thickness of the resin layer, and the uncured resin layer is preferably cured by applying an acceleration voltage of usually 70 to 300 kV.

In irradiation of the electron beam, the higher the acceleration voltage is, the more the penetrability of the electron beam is increased, and therefore when using a substrate which is deteriorated by the electron beam, the acceleration voltage is selected so that a depth of penetration of the electron beam is substantially the same as a thickness of the resin layer, whereby the electron beam can be inhibited from being irradiated excessively onto the substrate, and deterioration of the substrate caused by irradiation with an excessive amount of the electron beam can be kept to a minimum.

A dosage of the electron beam irradiated is preferably such an amount that a cross-linking density of the resin layer is saturated, and it is selected in a range of usually 5 to 300 kGy (0.5 to 30 Mrad), preferably 10 to 50 kGy (1 to 5 Mrad).

Further, the electron beam source shall not specifically be restricted, and capable of being used are various electron beam accelerators such as a Cockroft-Walton type accelerator, a van de Graaff type accelerator, a resonance transformer type accelerator, an insulating core transformer type accelerator, a linear type accelerator, a Dynamitron type accelerator and a high-frequency type accelerator.

When a UV ray is used as the ionizing radiation, the radiation containing a UV ray having a wavelength of 190 to 380 nm is irradiated. The UV ray source shall not specifically be restricted, and used are, for example, a high-pressure mercury lamp, a low-pressure mercury lamp, a metal halide lamp, a carbon arc lamp and the like.

Various additives can be added to the cured resin layer thus formed to impart various functions, for example, a so-called hard coat function having a high hardness and an abrasion resistance, a defogging coat function, a stain resistant coat function, a glare-proof coat function, an antireflective coat function, a UV shielding coat function and an IR shielding coat function.

The decorative sheet of the present invention can be used as a decorative plate by bonding on various substrate plates. To be specific, a decorative sheet 1 is bonded, as shown in FIG. 2, on a substrate plate 10 via an adhesive layer 9.

The substrate plate which is an adherend shall not specifically be restricted and can suitably be selected from plastic sheets, metal plates, wood plates of timbers, ceramic materials and the like according to the applications. When the above substrate plates, in particular, the plastic sheets are used for the substrate plate, one surface or both surfaces thereof can be subjected, if necessary, to physical or chemical surface treatment by an oxidation method or a roughening method in order to enhance an adhesive property of the substrate plate to the decorative sheet.

The oxidation method described above includes, for example, corona discharge treatment, chromium oxidation treatment, flame treatment, hot air treatment and ozone/UV treatment. The roughening method includes, for example, a sandblast method and a solvent-treating method. The above surface treatments can suitably be selected according to the kind of the substrate plate, and generally the corona discharge treatment method is preferably used from the viewpoints of an effect and an operability.

The plastic sheets include sheets comprising various synthetic resins. The synthetic resins include polyethylene resins, polypropylene resins, polymethylpentene resins, polyvinyl chloride resins, polyvinylidene chloride resins, polyvinyl alcohol resins, vinyl chloride-vinyl acetate copolymer resins, ethylene-vinyl acetate copolymer resins, ethylene-vinyl alcohol copolymer resins, polyethylene terephthalate resins, polybutylene terephthalate resins, polyethylene naphthalate-isophthalate copolymer resins, polymethyl methacrylate resins, polyethyl methacrylate resins, polybutyl acrylate resins, polyamide resins represented by nylon 6, nylon 66 and the like, cellulose triacetate resins, cellophane, polystyrene resins, polycarbonate resins, polyallylate resins, polyimide resins and the like.

The metal plates which can be used include, for example, plates comprising aluminum, iron, stainless steel, copper and the like, and plates obtained by plating the above metals can be used as well.

The wood plates include sliced veneers, veneers, plywood, particle boards and medium-density fiber (MDF) boards of various materials such as Japanese cedar, Japanese cypress, zelkova seratta, pine, lauan, teak, Melapi and the like. They can be used alone or in the form of laminates. The wood plates include not only wood plates but also plastic plates containing paper powder and papers which are reinforced and provided with a strength.

Te examples of the ceramic materials include ceramic base building materials such as gypsum boards, calcium silicate boards and wood chip cement boards, pottery and porcelain, glass, porcelain enamel, baked tiles and boards comprising volcanic ash as a main raw material.

In addition to the above substrate plates, capable of being used as well for the substrate plate are composites of various materials such as plates of fiber-reinforced plastics (FRP), plates obtained by sticking iron plates on both surfaces of a paper honeycomb and plates obtained by interposing a polyethylene resin between two aluminum plates.

The above substrate plates may be subjected to treatment such as formation of a primer layer and may be coated with a paint in order to control a color thereof, or patterns may be formed thereon in advance from the viewpoint of a design. The targets of the substrate plate which is an adherend are plate materials such as a flat plate and a curved plate comprising various materials and three-dimensional products (molded articles) in which the materials described above are used alone or in the form of a composite thereof.

A backing material such as Japanese papers, machine-made papers, synthetic papers, nonwoven fabrics, woven fabrics, cheese cloths, impregnated papers and synthetic resin sheets may be adhered on the decorative sheet. Adhesion of the backing material carries out actions such as reinforcement of the decorative sheet itself, prevention of cracking or breaking of the decorative sheet and prevention of bleeding of an adhesive onto a surface of the decorative sheet to prevent the defectives from being produced, makes handling easier and makes it possible to enhance the productivity.

The substrate plate on which the decorative sheet is placed in the form of a cut sheet or a continuous sheet through an adhesive is pressed by means of a laminating apparatus such as a cold press, a hot press, a roll press, a laminator, a wrapping machine, an edge-bonding machine and a vacuum press to adhere the decorative sheet on a surface of the substrate plate, whereby a decorative plate is prepared.

The adhesive is applied by means of a coating apparatus such as a spray, a spreader, a bar coater and the like. Vinyl acetate resin base adhesives, urea resin base adhesives, melamine resin base adhesives, phenol resin base adhesives and isocyanate base adhesives are used for the adhesive alone or in the form of a mixed adhesive obtained by optionally mixing them. Capable of being used is the adhesive which is mixed, if necessary, with inorganic powder such as talc, calcium carbonate, clay and titanium white, wheat flour, wood flour, plastic flour, a colorant, an insecticide, an antiseptic agents and the like. In general, the adhesive has a solid content of 35 to 80 mass %, and it is applied on the surface of the substrate plate in a coating amount falling in a range of 50 to 300 g/m$^2$.

The decorative sheet is usually bonded on the substrate plate by a method in which an adhesive layer is formed on a back surface of the decorative sheet of the present invention and in which the substrate plate is bonded thereon or a method in which an adhesive is applied on the substrate plate and in which the decorative sheet is bonded thereon.

The decorative plate thus produced can be cut into an optional size, and then the surface or butt end part thereof can be subjected to optional decorating works such as grooving work and chamfering work by means of a cutting work machine such as a router and a cutter. The decorative plate can be used for various applications, for example, interior or exterior materials for buildings such as walls, ceilings, floors and the like, surface decorative plates for fittings such as window frames, doors, balustrades, base boards, verandahs, malls and the like, surface decorative plates of cabinets for kitchen wares, furnitures, light-electrical appliances, OA devices and the like, interior and exterior decorations for vehicles and the like.

EXAMPLES

The present invention shall be explained in further details below with reference to examples and comparative examples, but the present invention shall by no means be restricted by these examples.

Evaluation Methods:

The decorative sheets obtained in the respective examples were evaluated by the following methods.

(1) Evaluation of Gloss

The gloss values in a high lustrous region and a low lustrous region were measured on the condition of an incident angle of 25° by means of a gloss meter ("micro-TRI-gloss" manufactured by Gardner Co., Ltd.). It is shown that the higher the value is, the higher the luster (higher gloss) is, and it is shown that the lower the value is, the lower the luster (lower gloss) is.

(2) Measurement of Haze

The haze value was measured by means of a haze meter (model number "HN-150" manufactured by MURAKAMI COLOR RESEARCH LABORATORY). It is shown that the smaller the value is, the higher the transparency is, and it is shown that the smaller the value is, the lower the transparency is.

(3) Measurement of Slipping Angle

The slipping angle was measured by means of a slipping testing machine (friction measuring equipment AN type manufactured by Toyo Seiki Seisaku-sho, Ltd.). It is shown that the larger the value (slipping angle) is, the less the decorative sheet is liable to slip, and it is shown that the smaller the value is, the more the decorative sheet is liable to slip.

(4) Wiping Property of Oil Base Ink

Writing was carried out on the coated surface with an oil base ink, and then the ink was wiped off with a gauze three minutes later to visually evaluate the erasability.

○: trace of ink is not found at all

Δ: trace of ink is found but slight, and it is practically no problem

χ: trace of ink markedly remains (5) Cellophane Adhesive Tape Resistance

A part of the surfaces of the decorative materials obtained in the examples and the comparative examples was rubbed ten times with an eraser, and a cellophane tape ("Sellotape (trade name)" 25 mm width, a cellophane adhesive tape manufactured by NICHIBAN CO., LTD.) was strongly adhered on the part at room temperature, followed by forcibly peeling off the above cellophane tape in a direction of 90 degrees to the surface of the decorative material. This was repeated ten times, and then the surface condition was observed.

○: surface condition is not roughened at all

Δ: surface condition is roughened but slight, and it is practically no problem

χ: surface condition is notably roughened

Example 1

An interlayer-reinforced paper for building materials having a basis weight of 30 g/m$^2$ was used as the substrate 2 to provide a (whole solid printing) layer having a coating amount of 3 g/m$^2$ on one surface of the substrate by a gravure printing method using an ink containing a binder comprising an acrylic resin and nitrocellulose and a colorant comprising titanium white, iron oxide red and chrome yellow, whereby a colored layer 6 was formed. A picture layer 7 having a woodgrain pattern was formed thereon by a gravure printing method using an ink containing a binder comprising nitrocellulose and a colorant comprising iron oxide red as a principal component.

Next, a coating composition containing a binder comprising a polyester urethane base resin having a number average molecular weight of 20,000 and a glass transition temperature (Tg) of −59.8° C. and polyisocyanate comprising tolylenediisocyanate was used to carry out gravure printing on the whole surface in a coating amount of 2 g/m$^2$, whereby a penetration-preventing layer 8 (primer layer) was formed.

An electron beam-curable resin composition comprising 20 mass parts of dipentaerythritol hexaacrylate as urethane acrylate, 50 mass parts of trimethylolpropane triacrylate which is a trifunctional monomer, 28 mass parts of ethylene oxide-modified bisphenol A diacrylate which is a difunctional monomer, 0.5 mass part of monofunctional silicone methacrylate (manufactured by Shin-Etsu Chemical Co., Ltd., functional group equivalent: 3000) and 1.5 mass part of tetrafunctional silicone acrylate (manufactured by Shin-Etsu Chemical Co., Ltd., functional group equivalent: 4000) was applied on the above ink layers in a coating amount of 13 g/m$^2$ by a gravure offset coater method. After applying, the electron beam-curable resin composition was irradiated with an electron beam at an acceleration voltage of 175 kV and a dose of 50 kGy (5 Mrad) to cure the resin composition, whereby a surface protective layer 5 was formed. Then, curing was carried out at 70° C. for 24 hours to obtain a decorative sheet.

The decorative sheet thus obtained was used to evaluate a gloss, a haze, a slipping angle, a wiping property of an oil base ink and a cellophane adhesive tape resistance. The results thereof are shown in Table 1.

Further, a back surface of the decorative sheet described above was adhered on a lauan plywood 10 having a thickness of 2.5 mm as a substrate through an adhesive layer formed by applying an ethylene-vinyl acetate base adhesive "BA-820" which is an aqueous emulsion manufactured by Chuo Science Chemical Co., Ltd. on the wood plywood on the condition of a coating amount of 60 g/m² (wet), whereby a wood decorative plate was prepared. The evaluation result of the slipping angle is shown in Slipping angle (after adhered on the wood plywood) of Table 1.

Comparative Example 1

A decorative sheet was obtained in the same manner as in Example 1, except that in the surface protective layer 5 described in Example 1, an amount of the monofunctional silicone methacrylate (manufactured by Shin-Etsu Chemical Co., Ltd., functional group equivalent: 3000) was changed to 2 mass parts and that the tetrafunctional silicone acrylate was not used.

The decorative sheet thus obtained was used to evaluate a gloss, a haze, a slipping angle, a wiping property of an oil base ink and a cellophane adhesive tape resistance. The results thereof are shown in Table 1.

Further, a wood decorative plate was obtained in the same manner as in Example 1, except that the decorative sheet prepared in Example 1 was changed to the decorative sheet prepared in Comparative Example 1. The evaluation result of the slipping angle is shown in Slipping angle (after adhered on the wood plywood) of Table 1.

Comparative Example 2

A decorative sheet was obtained in the same manner as in Example 1, except that in the surface protective layer 5 described in Example 1, the monofunctional silicone methacrylate was not used and that 2 mass parts of the tetrafunctional silicone acrylate (manufactured by Shin-Etsu Chemical Co., Ltd., functional group equivalent: 4000) was used. The evaluation results thereof are shown in Table 1.

Further, a wood decorative plate was obtained in the same manner as in Example 1, except that the decorative sheet prepared in Example 1 was changed to the decorative sheet prepared in Comparative Example 2. The evaluation result of the slipping angle is shown in Slipping angle (after adhered on the wood plywood) of Table 1.

The decorative sheet obtained in Example 1 showed high performances in all the points of a gloss, a haze, a slipping angle, a wiping property of an oil base ink and a cellophane adhesive tape resistance. Further, the decorative plate obtained by processing the above decorative sheet obtained in Example 1 was inhibited in a slipping property and less liable to cause collapse of cargo.

TABLE 1

|  |  | Example | Comparative Example | |
|---|---|---|---|---|
|  |  | 1 | 1 | 2 |
| Silicone methacrylate | | | | |
| Content | weight part | 0.5 | 2 | |
| Number of functional group | Group | 1 | 1 | |
| Functional group equivalent | * | 3000 | 3000 | |
| Silicone acrylate | | | | |
| Content | weight part | 1.5 | | 2 |
| Number of functional group | Group | 4 | | 4 |
| Functional group equivalent | * | 4000 | | 4000 |
| Urethane acrylate | weight part | 20 | 20 | 20 |
| Trifunctional monomer | weight part | 50 | 50 | 50 |
| Difunctional monomer | weight part | 28 | 28 | 28 |
| Gloss | — | 85 | 82 | 84 |
| Haze | — | 2.8 | 11.6 | 1.4 |
| Slipping angle | ° | 21 | 8 | 23 |
| Slipping angle (after adhered on the wood plywood) | ° | 25 | 12 | 26 |
| wiping property of oil base ink | — | ○ | ○ | X |
| Cellophane adhesive tape resistance | — | ○ | ○ | ○ |

* Functional group equivalent = molecular weight/number of functional group

INDUSTRIAL APPLICABILITY

According to the present invention, capable of being provided are a decorative sheet having a high gloss feeling which is excellent in a specularity and an oil base ink erasability on a surface and inhibited in a slippiness of a plate processed to a decorative plate and which has an ionizing radiation-curable resin in a surface protective layer and a decorative plate prepared by bonding the above decorative sheet on a substrate via an adhesive layer.

What is claimed is:

1. A decorative sheet having a layer obtained by cross-linking and curing an ionizing radiation-curable resin as a surface protective layer, wherein both mono- or difunctional silicone methacrylate and multifunctional silicone acrylate are contained in the ionizing radiation-curable resin, a ratio content of said mono- or difunctional silicone methacrylate to content of said multifunctional silicone acrylate contained in said ionizing radiation-curable resin is 1:2 to 1:3 (mass ratio).

2. The decorative sheet as described in claim 1, wherein the multifunctional silicone acrylate described above has a functional group equivalent of 3000 or less, and a content thereof is 2 mass parts or more per 100 mass parts of the ionizing radiation-curable resin.

3. The decorative sheet as described in claim 1, wherein the multifunctional silicone acrylate described above has a tetrafunctional or higher functional group.

4. A decorative plate prepared by bonding the decorative sheet as described in claim 1 on a substrate via an adhesive layer.

5. The decorative sheet as described in claim 2, wherein the multifunctional silicone acrylate described above has a tetrafunctional or higher functional group.

6. A decorative plate prepared by bonding the decorative sheet as described in claim 5 on a substrate via an adhesive layer.

7. A decorative plate prepared by bonding the decorative sheet as described in claim 3 on a substrate via an adhesive layer.

8. A decorative plate prepared by bonding the decorative sheet as described in claim 2 on a substrate via an adhesive layer.

9. The decorative sheet as described in claim 1, wherein the surface protective layer overlies a substrate of the decorative sheet, and a concentration of the mono- or difunctional silicone methacrylate in an outermost surface layer of the surface protective layer is higher than that at a side of the surface protective layer closest to the substrate of the decorative sheet.

10. The decorative sheet as described in claim 9, wherein the multifunctional silicone acrylate is dispersed uniformly in the surface protective layer.

11. The decorative sheet as described in claim 1, wherein the multifunctional silicone acrylate is dispersed uniformly in the surface protective layer.

12. The decorative sheet as described in claim 3, wherein the multifunctional silicone acrylate has four to six functional groups.

13. The decorative sheet as described in claim 1, wherein a content of the mono- or difunctional silicone methacrylate is 1.5 to 20 mass parts per 100 mass parts of the ionizing radiation-curable resin, and a content of the multifunctional silicone acrylate is 1 to 20 mass parts per 100 mass parts of the ionizing radiation-curable resin.

14. The decorative sheet as described in claim 1, comprising a substrate of the decorative sheet, a picture layer thereover and said surface protective layer over said picture layer.

15. The decorative sheet as described in claim 14, wherein a penetration preventing layer is provided between the surface protective layer and the picture layer.

* * * * *